Figure 1:
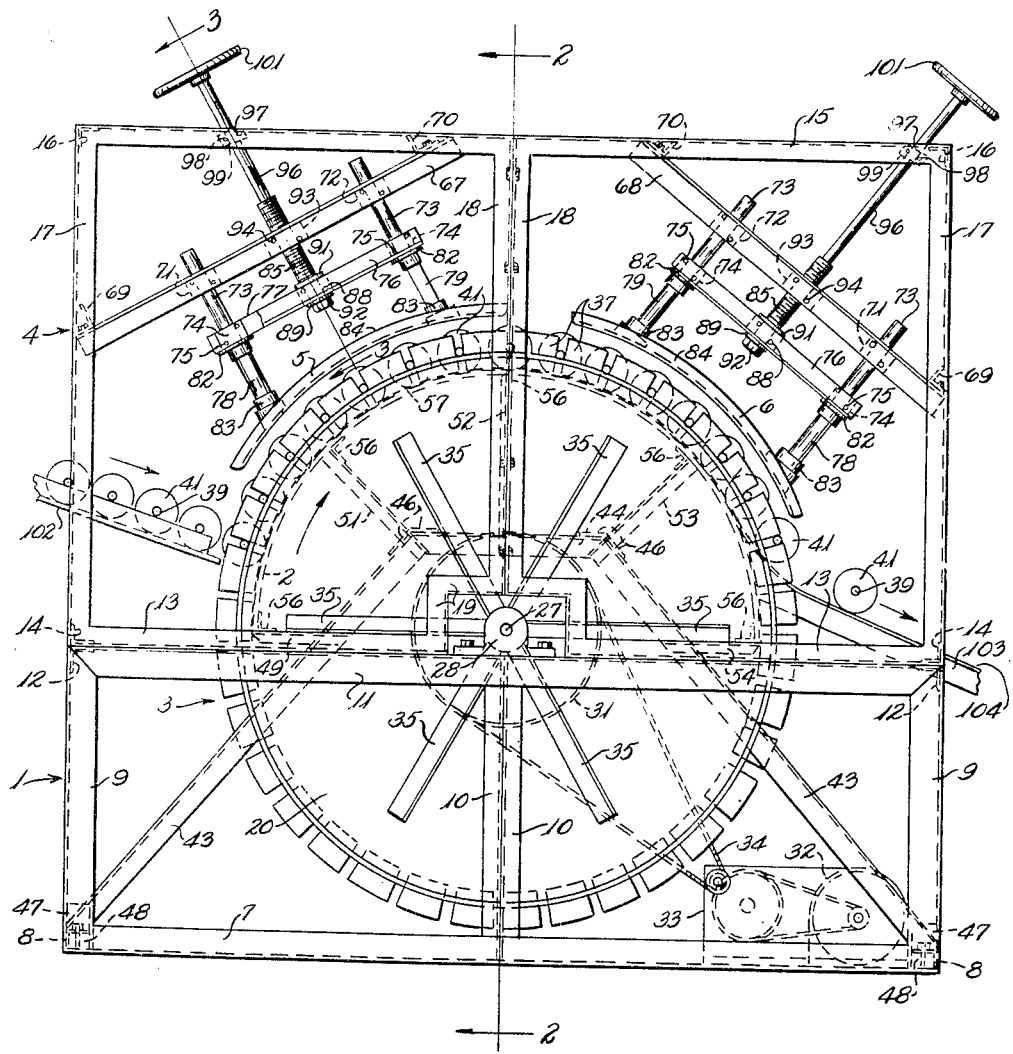

Jan. 29, 1957 G. P. BOSOMWORTH ET AL 2,779,848
MACHINE FOR ELECTRONIC PROCESSING OF DIELECTRIC ARTICLES
Original Filed Oct. 28, 1950 3 Sheets-Sheet 1

INVENTORS
GEORGE P. BOSOMWORTH
ROBERT I. BISHOP
BY
W. A. Fraser
ATTY-

Jan. 29, 1957 G. P. BOSOMWORTH ET AL 2,779,848
MACHINE FOR ELECTRONIC PROCESSING OF DIELECTRIC ARTICLES
Original Filed Oct. 28, 1950 3 Sheets-Sheet 2

INVENTORS
GEORGE P. BOSOMWORTH
ROBERT I. BISHOP
BY
W. A. Fraser
ATTY.

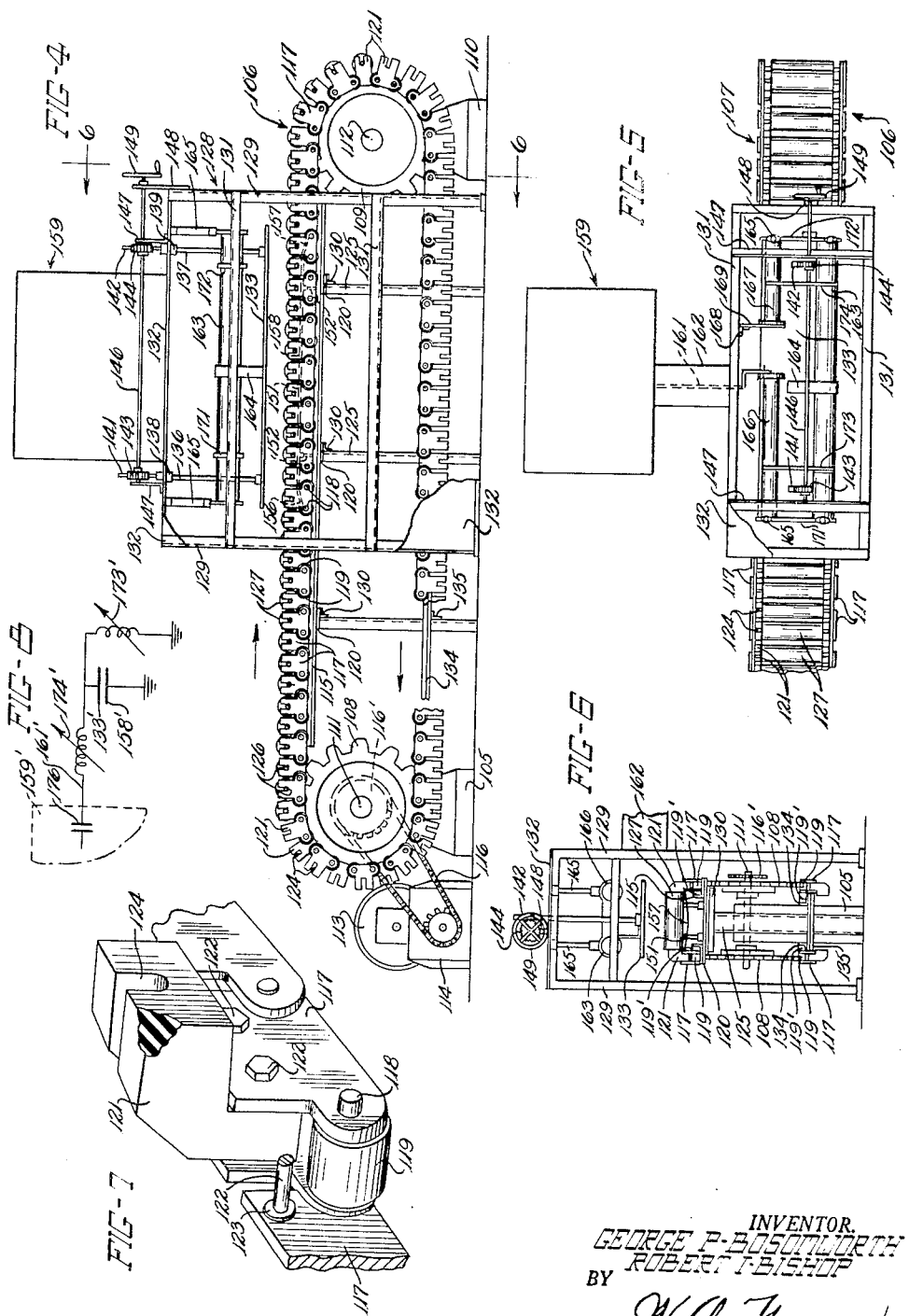

United States Patent Office 2,779,848
Patented Jan. 29, 1957

2,779,848
MACHINE FOR ELECTRONIC PROCESSING OF DIELECTRIC ARTICLES

George P. Bosomworth, Akron, and Robert I. Bishop, Cuyahoga Falls, Ohio, assignors to The Firestone Tire & Rubber Company, Akron, Ohio, a corporation of Ohio Original application October 28, 1950, Serial No. 192,803, now Patent No. 2,700,182, dated January 25, 1955. Divided and this application May 24, 1954, Serial No. 433,083

5 Claims. (Cl. 219—10.69)

This invention relates to the curing of cylindrical rubber articles, such as wringer rolls and, in particular, relates to the preheating of such articles by high-frequency electrical currents.

This application is a division of application No. 192,803, filed Oct. 28, 1950, now patent No. 2,700,182, granted January 25, 1955.

Vulcanization involves heating the article to be cured, and articles of large mass not only require a long time to come up to proper curing temperature but, in addition, the curing lacks uniformity due to lag in heat transfer within the article.

According to modern methods, the problem of the time required to bring a body up to temperature, as well as the problem of uniformity of cure, has been solved, in certain cases, by heating a body with high-frequency currents. In this process, the heat is generated within the body itself and, generally speaking, is equally and concurrently effective throughout the body. However, such a system requires molds of special material for its effective employment, one essential being high dielectric strength. The forming of massive rubber bodies, such as wringer rolls, in a mold requires high pressures and a correspondingly high mechanical strength in the mold, and molds of dielectric composition are not suitable for such usage.

By the present invention, rubber masses are preheated by exposure to a high-frequency field for a time sufficient to bring them up to approximate curing temperature, but without effecting any substantial degree of cure, so that the thus quickly and uniformly heated article may be formed, under pressure, in a conventional, steam-heated mold. In this way, the curing time is considerably shortened and the cure is more uniform throughout the article.

Even in the high-frequency treatment there may be some lack of uniformity of heating, depending upon the shape of the body being treated. Thus, although the electric field itself may be uniform, a cylindrical object such as a wringer roll will not present a uniform thickness in the field. By the present invention, this shortcoming is obviated by causing the cylinders to turn about their axes in traversing the electric field.

It is, therefore, an object of the invention to provide means for shortening the curing time of rubber articles. Another object to provide a machine to render the cure of rubber articles more uniform throughout the articles. More particularly, it is an object to provide a machine to shorten the time of cure and render it more uniform by preheating in a high-frequency field. In still greater particular, it is an object to provide a machine to preheat a rubber article to a point short of vulcanization in a high-frequency field while moving the article in a manner to provide uniform heating.

Figure 2:
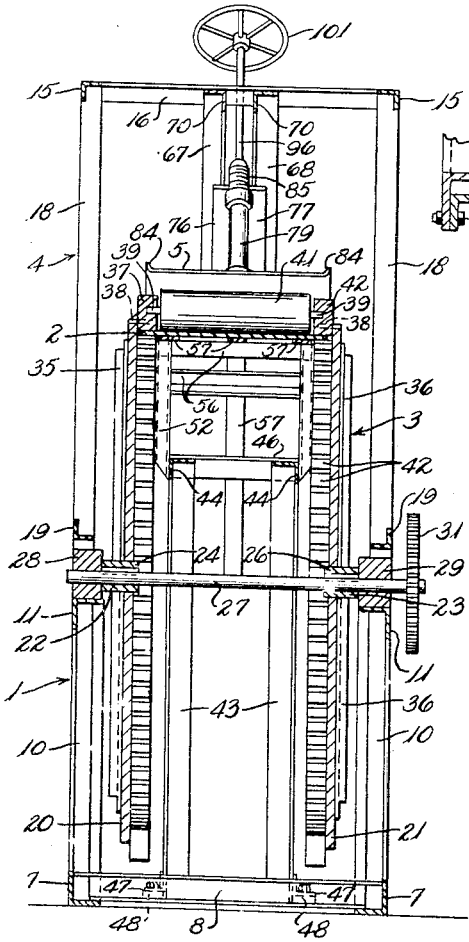
Figure 3:
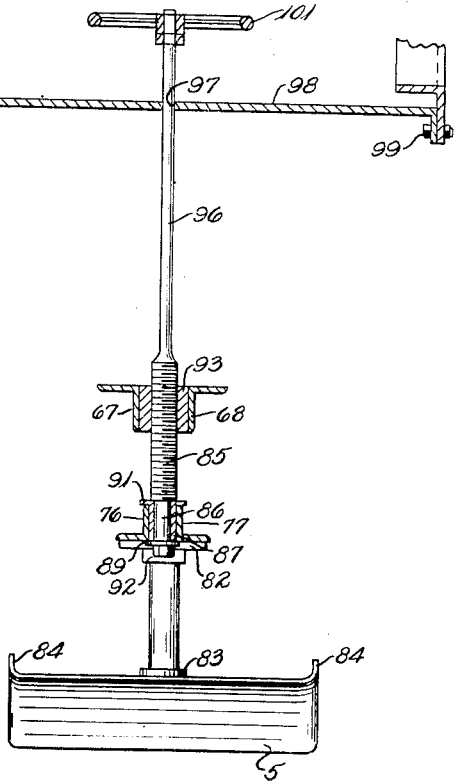

These and other objects, which will be apparent to those skilled in the art, are achieved by the present invention, preferred forms of which are described in the following specification and illustrated in the drawings, in which:

Fig. 1 is a side view, in elevation, of an electronic heating assembly having arcuately formed electrodes, Fig. 2 is a sectional view taken on the line 2—2 of Fig. 1, Fig. 3 is a sectional view taken on the line 3—3 of Fig. 1, Fig. 4 is a side view of a modified, electronic heating assembly employing electrodes of generally planar form, Fig. 5 is a partial top plan view of Fig. 4, Fig. 6 is a view taken along the line 6—6 of Fig. 4, Fig. 7 is an enlarged, perspective view of a detail, showing one of the conveyor link blocks, and Fig. 8 is a wiring diagram of the electrode system of Fig. 4.

Referring to the drawings by characters of reference, there is shown, in Fig. 1, a framework of angle irons, secured together by welding, and comprising a lower part 1, which supports a lower, arcuate electrode 2 and a conveyor wheel, indicated generally by the numeral 3. An upper part 4 of the structure, resting on part 1, supports the two upper, arcuate electrodes 5 and 6 and associated mechanism.

Lower half 1 of the framework comprises a rectangular, open, box-like structure of angle iron having, at its base, horizontal rails 7, 8, vertical corner rails 9, intermediate pairs of contacting, vertical rails 10, and upper, horizontal rails 11, 12.

Similarly, the upper part of the unit has lower, horizontal rails 13, 14, upper horizontal rails 15, 16, and vertical rails 17, 18. The lower ends of rails 18 and the inner ends of rails 13 are foreshortened and joined by a rectangular framework 19 forming a recess, to give clearance for a wheel bearing, as will appear.

Wheel 3 comprises two plywood discs 20, 21, with hubs 22, 23 keyed as at 24, 26 to a shaft 27 journaled in bearing blocks 28, 29, carried on upper rails 11 of the lower framework.

Shaft 27 has keyed thereto, at one end, a sprocket 31, driven by a motor 32, a reduction gearing unit 33, and a chain 34.

Disks 20, 21 are strengthened by radially arranged angle bars 35 and 36. A series of blocks 37, of hard wood such as maple, are secured to wheel 20, as by dowels 38, and are positioned in circumferentially spaced relation about the outer periphery of the wheel, and extend therebeyond to provide slots for receiving the spindles 39 of the wringer rolls 41, which are to be heated. Blocks 42 are similarly located on disk 21, with the respective slots aligned with those between the blocks on disk 20.

For support of lower electrode 2, a truss having four slant legs 43 and a pair of upper, bridge members 44 is secured to the lower portion of framework 1, the truss being rendered rigid by four cross plates 46 secured at the angles of the truss. The truss is secured to the framework by angle brackets 47, which are bolted to blocks 48 on lower cross bars 8 of the framework.

Angle bars 49, 51, 52, 53, and 54, secured to the truss at the upper part thereof, have their terminal ends on the arc of a circle and support, through cross angle bars 56, three strips 57 of electrically insulating material in the form of semi-circles, to which latter the lower electrode 2 is secured.

The electrode assembly in each half of the upper framework is supported on a pair of diagonally arranged angle bars 67, 68, bolted to angle bars 69 and 70, which are welded to upper frame members 15 and to corner uprights 17.

Guide blocks 71, 72, of bronze or other bearing metal, bolted to angle bars 67, 68, are bored to receive guide shafts 73 of the electrode, for sliding motion. The guide shafts have rectangular, lower heads 74, laterally bored to receive bolts 75, by means of which they are secured between a pair of angle bars 76, 77. Rods 78, 79 of electrically insulating material have metallic, upper, end flanges 82 suitably secured to angle bars 76, 77 and metallic, lower, end flanges 83 suitably secured to the upper electrode, which latter is arcuate and concentric with wheel 3, and has upwardly turned edges 84.

The upper electrode is moved toward and from wheel 3 by means of a screw 85 (Fig. 3) with a reduced end 86 rotatable in a bore in a bearing block 87, secured by bolts 88, between angle bars 76, 77, centrally thereof. Neck portion 86 is provided with washers 89, 91 and is secured by a nut 92. Screw 85 is threaded in a block 93, secured between bars 67, 68 by bolts 94, and has a narrow shank 96 passing through a bore 97 in a cross bar 98 secured by bolts 99 to the sides of the upper unit of the framework. A handwheel 101 is secured on the end of the screw shank, externally of the framework. It will be seen that by turning handwheel 101, electrode 6 may be caused to either approach or recede from wheel 3.

Electrodes 2 and 6, each of which is electrically insulated from the framework, will have respective leads connected to a voltage source delivering high-frequency current. Since these elements are well understood in the art, they are not indicated in the drawing, except in schematic form in Fig. 7.

The wringer rolls 41 being processed are gravity fed down an inclined chute 102, conveniently located near one end of the lower electrode. As wheel 3 turns, the spaces between blocks 37 receive the spindles 39 of rolls 41 and carry them in a circular path. The position of the lower electrode is such that the rolls 41 dwell thereon in their progress and are thus caused to rotate about their spindles, while advancing through the high-frequency field. Thus any diametral zone of the roll is subjected to the same heat treatment as every other such zone and the roll is uniformly heated.

At the opposite end of the lower electrode, an inclined slide 103 of wood, sheathed with thin metal 104, is secured to the framework and serves to carry the heated rolls to an adjacent area for molding and curing without delay, so that full advantage may be taken of the heat in the articles.

In Fig. 4 is shown a modified form of heater in which the rolls follow a generally straight path instead of a curved path.

A pair of endless chains, indicated generally by the numerals 106, 107, are trained over pairs of sprockets 108, 109, rotating on shafts 111, 112. The latter, which are mounted on uprights 105, 110, are driven by a motor 113, a gear reduction unit 114, a chain 116, and a sprocket 116'.

The chain links comprise identical link plates 117 of generally T form, bored to receive a pair of pins 118, on which are mounted rollers 119. Successive plates 117 overlap at their ends, with each pin 118 articulating four plates. A block 121 of electrically insulating material, such as hard rubber, and of generally L form is secured between each pair of plates 117 by a pair of bolts 122. In the link structure shown, the distance between pairs of plates on successive links alternates by an amount equal to twice the thickness of a single plate and, therefore, in the more widely separated pairs, washers 123 are provided on bolts 122 to take up the space between the faces of the block and the plates. Each block 121 has, in its face, outwardly of the chain, a slot 124 for receiving the spindles 126 bearing the rough-formed masses of rubber 127 ultimately intended for molding and curing in cylindrical form.

The upper span of the conveyor chain is supported by a pair of horizontal rails 115 receiving the chain rollers 119. The rails 115 comprise parallel, horizontally arranged angle bars supported on cross plates 120, each of the latter being carried on the top of an upright channel member 125 and on a transverse angle bar 130 attached to the channel. The lower span of the chain is supported on a pair of rails 134 comprising angle bars supported on transverse angle bars 135 attached to channel uprights 125. For this purpose, auxiliary rollers 119' (Fig. 6) are provided on shafts 118, at spaced intervals along the chain, inwardly of the chain. Obviously these lower rails cannot extend inwardly beyond auxiliary rollers 119'.

The spindles of the rollers are fed by hand, or from a suitable feed chute, into the slots 124 and the articles 127 are carried by the chain with spindles 126 resting in the bottoms of slots 124.

The chain passes through an electronic heating oven, shown generally at 128, which comprises a framework having corner uprights 129 and cross braces 131. The covering sheeting over the framework is indicated generally by the numeral 132, but has been largely omitted in the drawing to show interior details.

An upper electrode 133 is suspended from the upper part of the framework by means of a pair of electrically insulating rods 136, 137, which are slidable in collars 138, 139 carried by the top covering 132 of the oven. Racks 141, 142, carried by rods 136, 137, are engagable by pinions 143, 144, rotation of which effects vertical adjustment of the upper electrode. The pinions are mounted on a shaft 146 journaled in angle bars 147 and an upright strap 148 carried by the upper framework of the oven, and the shaft is rotated by a hand wheel 149.

The lower electrode is indicated by the numeral 151 and is supported on uprights 152 secured to two of the cross plates 120. The lower electrode, which is fixed in position, has downwardly slanted ramps 156, 157 on its ends adjacent the oven openings and has a main central, horizontal portion 158. This central portion is adapted to support the articles under cure as they pass through the oven and, therefore, is located at a higher level than the bottoms of the articles in the position they occupy when supported in the slots 124 of the conveyor-chain blocks. Thus, as the articles are carried into the oven by the conveyor chain, they are gradually lifted from the level where their spindles dwell on the bottoms of slots 124 of the chain. In passing over the central span 158 of the electrode, they remain in this elevated position, but are continually urged along by engagement of the sides of slots 124 with their spindles 126. In this movement, frictional engagement with the electrode causes the articles to rotate on their spindles and a uniform heating is effected, as in the case of the previously described form of the invention.

Power is derived from a voltage source, indicated generally at 159, adapted to deliver high-frequency current. Current is led to the oven through a conductor 161, passing through a connecting tunnel 162, and in electrical contact with a tunable coil suspended in fixed position by insulating rods 165 from the upper framework of the oven. The coil comprises a long, copper tube 163 carrying a depending copper strap 164, which is electrically connected, at its lower end to the upper electrode 133, and a pair of aligned copper tubes 166, 167, the former of which is connected at its inner end with lead 161, and the latter grounded to the framework at 168 through a lead 169. Tube 163 is connected at one end to the outer end of tube 166 by a copper bar 171, and at its other end to the outer end of tube 167 by a copper bar 172. A connecting bar 173 clamped to tubes 166 and 163 for adjustable positioning axially therealong serves as a tuning means, and a similar bar 174, connecting tubes 167 and 163, for tuning, is located on the opposite side of the lead strap 164. The lower electrode is grounded on the framework. The circuit, which is conventional in the art, is shown schematically in Fig. 8, wherein corresponding parts are qualified by prime marks. A condenser 176 in series with lead 161' is provided to keep direct current out of the oven circuit.

While certain preferred embodiments of the invention have been shown and described, the invention is not limited thereby since changes in the size, shape and arrangement, for instance, of the various parts may be made without departing from the spirit of scope of the appended claims.

What is claimed is:

1. An apparatus for heat treating rubbery wringer rolls having a cross section of curved periphery with a spindle mounted axially thereof and protruding at each end, comprising a circular conveyor wheel journaled for rotation about its axis, circular adjustable electrodes radially outward of and in parallel spaced relation to the outer periphery of the conveyor, at least one inner curved electrode positioned radially inwardly of and parallel to the periphery of said wheel as well as parallel to said adjustable electrodes, means to rotate the conveyor about its axis, said conveyor having slots on each outer peripheral edge adapted to receive said spindles in journaled relation, said spindles being normally seated in the bottoms of said slots.

2. An apparatus according to claim 1 having a feed for said wringer rolls positioned above a horizontal plane through the axis of said conveyor and inclined to permit each wringer roll to roll against the face of said conveyor as said conveyor rotates whereby the ends of the spindle of each wringer roll in turn slip into respective slots on said conveyor.

3. An apparatus for heat treating rubbery wringer rolls as in claim 1 having means adapted to rotate said conveyor and permit dwell of segments of the periphery of said conveyor sequentially under each said electrode.

4. An apparatus as in claim 1 having a gravity chute positioned against the downward moving side of said conveyor at a point above a horizontal center line through the axis of the conveyor and having ears extending along each side of the conveyor and adapted to engage the respective ends of the spindles as the conveyor rotates to guide the wringer roll away from the conveyor face and down the chute.

5. An apparatus for heat treating rubbery wringer rolls having a cross section of curved periphery with a spindle mounted axially thereof and protruding at each end comprising, an endless traveling conveyor, adjustable electrodes in parallel spaced relation to the outer peripheral surface of said conveyor, at least one inner electrode parallel to said adjustable electrodes and said conveyor and spaced from said outer electrodes whereby clearance is allowed for the passage of said conveyor, said conveyor having slots on each outer edge projecting radially and adapted to receive said spindles in journaled relation, said spindles being normally seated in the bottoms of said slots, and a feed for said wringer rolls positioned above a horizontal plane through the geometric center of said conveyor and inclined to permit said wringer rolls to bear against the face of said conveyor as said conveyor travels whereby the spindles of each wringer roll in sequence slip into slots on said conveyors, and means for rotating said wringer rolls and spindles as said conveyor passes between said electrodes.

References Cited in the file of this patent

UNITED STATES PATENTS

| | | |
|---|---|---|
| 2,414,362 | Denneen et al. | Jan. 14, 1947 |
| 2,490,206 | Calley | Dec. 6, 1949 |
| 2,501,776 | Kuljian | Mar. 28, 1950 |
| 2,525,356 | Hoyler | Oct. 10, 1950 |
| 2,635,352 | Phillips | Apr. 21, 1953 |

FOREIGN PATENTS

| | | |
|---|---|---|
| 705,172 | Great Britain | Mar. 10, 1954 |